(12) United States Patent
Setbacken et al.

(10) Patent No.: US 6,642,508 B2
(45) Date of Patent: Nov. 4, 2003

(54) SYSTEM AND METHOD IN AN ANGLE MEASURING SYSTEM WITH AN ENCODER ATTACHMENT SYSTEM FOR ATTACHING AN ENCODER TO A MOTOR SHAFT THROUGH THE USE OF A SPRING GENERATING A RADIAL PRESSURE

(75) Inventors: Robert Setbacken, Santa Barbara, CA (US); Paul K. Roach, Stoneham, MA (US); John Mathewson, Arcadia, CA (US)

(73) Assignee: Renco Encoders, Inc., Goleta, CA (US)

( * ) Notice: Subject to any disclaimer, the term of this patent is extended or adjusted under 35 U.S.C. 154(b) by 0 days.

(21) Appl. No.: 09/944,639

(22) Filed: Aug. 31, 2001

(65) Prior Publication Data
US 2003/0042408 A1 Mar. 6, 2003

(51) Int. Cl.⁷ .................................................. G01D 5/34
(52) U.S. Cl. ..................... 250/231.13; 33/1 PT; 341/13
(58) Field of Search ........................ 250/231.13–231.19, 250/239, 233; 341/11, 13, 31; 33/1 PT, 1 N, 572, 706–708

(56) References Cited

U.S. PATENT DOCUMENTS

| | | | | |
|---|---|---|---|---|
| 3,693,024 A | * | 9/1972 | Hulle et al. ............. | 250/231.15 |
| 3,728,551 A | * | 4/1973 | Culver et al. ........... | 250/231.16 |
| 4,031,441 A | | 6/1977 | Garrett | |
| 4,652,748 A | | 3/1987 | Siraky et al. | |
| 4,660,288 A | | 4/1987 | Dangschat | |
| 4,759,218 A | * | 7/1988 | Rodi et al. .................... | 324/175 |
| 5,981,940 A | | 11/1999 | Setbacken et al. | |
| 6,084,234 A | * | 7/2000 | Stridsberg .............. | 250/231.16 |
| 6,172,359 B1 | * | 1/2001 | Stridsberg .............. | 250/231.13 |
| 6,191,415 B1 | * | 2/2001 | Stridsberg .............. | 250/231.13 |
| 6,311,402 B1 | | 11/2001 | Brandl et al. | |

FOREIGN PATENT DOCUMENTS

| | | |
|---|---|---|
| DE | 30 38 005 | 5/1982 |
| DE | 89 15 109.7 | 4/1990 |
| JP | 1-84015 | 6/1989 |

OTHER PUBLICATIONS

Pending Reissue Patent Application Assigned to Renco Encoders: Ser. No.: 10/039,336, Filing Date: Oct. 29, 2001, Inventor: Setbacken et al.

* cited by examiner

Primary Examiner—Stephone B. Allen
Assistant Examiner—Christopher Glass
(74) Attorney, Agent, or Firm—Brinks Hofer Gilson & Lione (57) ABSTRACT

An angle measuring system that includes a drive shaft that rotates about an axis of rotation, an encoder and an encoder attachment system that has a Belleville disk spring that generates a radial pressure with respect to the axis of rotation so as to attach the encoder to the drive shaft.

19 Claims, 5 Drawing Sheets

SYSTEM AND METHOD IN AN ANGLE MEASURING SYSTEM WITH AN ENCODER ATTACHMENT SYSTEM FOR ATTACHING AN ENCODER TO A MOTOR SHAFT THROUGH THE USE OF A SPRING GENERATING A RADIAL PRESSURE

BACKGROUND OF THE INVENTION

1. Field of the Invention

The present invention relates to an angle measuring system with a coding disk for measuring the angular position of a drive shaft of a motor.

2. Discussion of Related Art

It is well known to use set screws to attach a disk hub of an encoder to a rotating shaft whose position is monitored by the encoder. One disadvantage of such attachment is that it is often unwieldy.

Accordingly, it is an object of the present invention to provide an angle measuring system in which an encoder is attached to a rotating shaft in a simple manner.

SUMMARY OF THE INVENTION

One aspect of the present invention regards an angle measuring system that includes a drive shaft that rotates about an axis of rotation, an encoder and an encoder attachment system that has a Belleville disk spring that generates a radial pressure with respect to the axis of rotation so as to attach the encoder to the drive shaft.

A second aspect of the present invention regards a method of attaching an encoder to a drive shaft that rotates about an axis of rotation by positioning an encoder adjacent to a drive shaft that rotates about an axis of rotation and rotating either a cap or a screw so as to compress a spring that generates a radial pressure with respect to the axis of rotation so as to attach the encoder to the drive shaft.

The invention will be explained in greater detail in what follows by means of exemplary embodiments represented in the drawings.

DETAILED DESCRIPTION OF THE PREFERRED EMBODIMENTS

Figures 1, 2, 3:
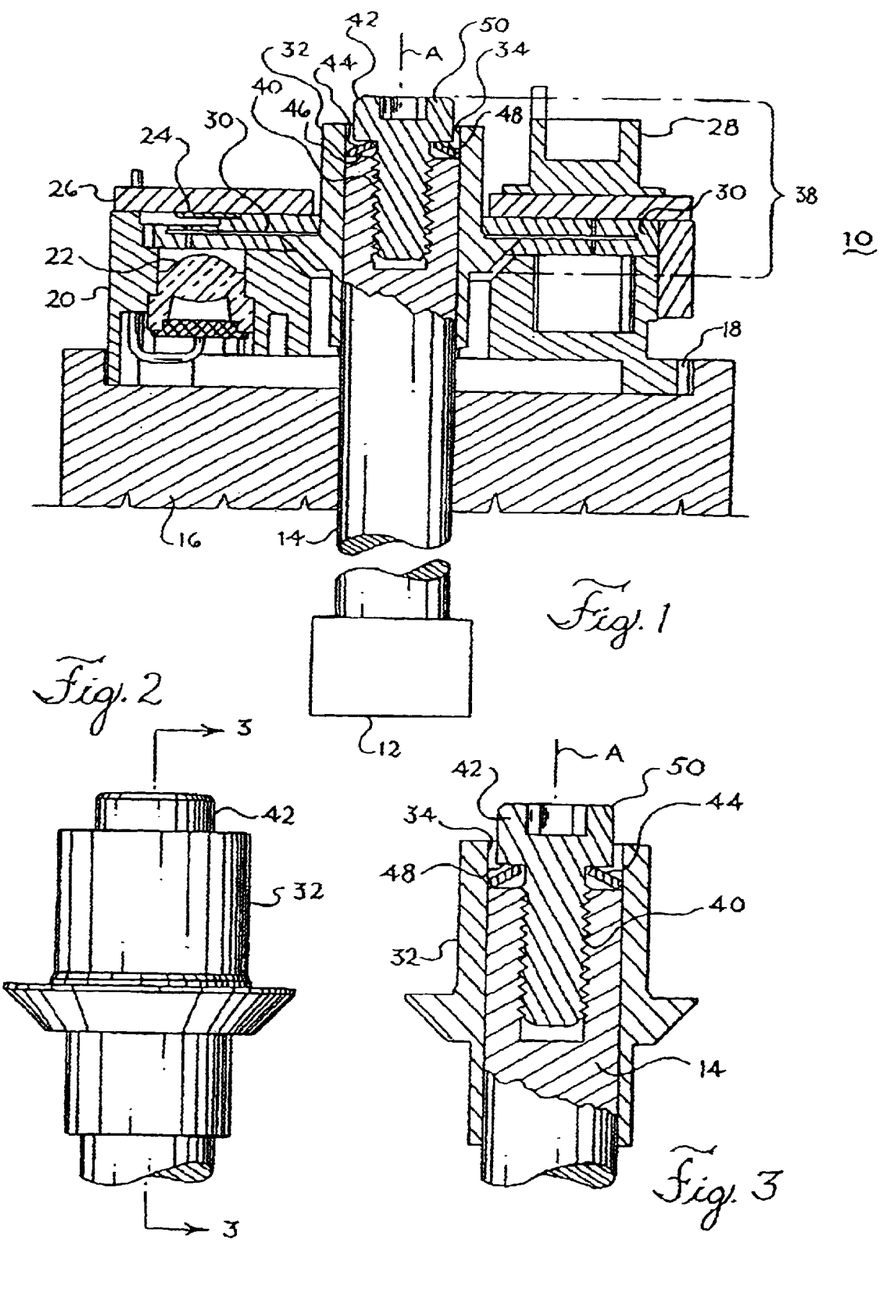
FIG. 1 illustrates a cross-sectional view of an embodiment of an angle measuring system according to the present invention.
FIG. 2 illustrates a front view of an embodiment of an encoder hub attachment system used with the angle measuring system of FIG. 1.
FIG. 3 is a cross-sectional view of the encoder hub attachment system of FIG. 2 taken along lines 3—3 of FIG. 2.

An angle measuring system commonly referred to as an encoder 29 is shown in FIG. 1 that includes a motor 12 with a rotating drive shaft 14 that extends through an endplate 16 of the motor 12. The endplate 16 may have a recess 18 that supports an encoder housing 20. Such a recess 18 is not necessary for the present invention. Within the encoder housing 20, a light source 22 is positioned. The light source 22 is aligned with a light sensor 24 that is attached to the underside of a PC board 26 that is attached to the top of the encoder housing 20. An electrical connector 28 is attached to the PC board 26 and electrically connected to the light sensor 24.

As shown in FIG. 1, the encoder 29 and its associated encoder disk 30 are positioned between the light source 22 and the light sensor 24. The encoder disk 30 is integrally attached to a disk hub 32 that engages the drive shaft 14. The disk hub 32 has a central cylindrical-like bore 34.

As shown in FIG. 1, a portion of the drive shaft 14 is inserted into the bore 34 of the disk-hub 32 where the dimensions and tolerances for the drive shaft 14 and bore 34 are well-known. Once the encoder 29 is placed on the drive shaft 14 and all adjustments have been made to properly position the encoder 29 with respect to the drive shaft 14, the encoder 29 is secured to a mounting surface 36, presumed to be perpendicular to the rotational axis of the drive shaft 14.

The disk-hub 32 is secured to the drive shaft 14 by an encoder hub attachment system 38 that includes: 1) a threaded hole 40 that is formed in the end of the drive shaft 14 and lies along the axis of rotation A of the drive shaft 14, 2) a screw 42 and 3) a spring, such as a Belleville disk spring 44 or a conical washer. As shown in FIGS. 1 and 3, the Belleville disk spring 44 is placed on and supported on an annular ledge 46 that is defined by the end of the drive shaft 14. Once the Belleville disk spring 44 is positioned on the ledge 46, the screw 42 is inserted into and threadedly engages the threaded hole 40 of the drive shaft 14.

Note that the Belleville disk spring 44 must have an outer diameter slightly smaller than the bore 34 of the disk hub 32 and an opening large enough to accommodate the screw 42. Such a Belleville disk spring 44 will have a portion of its outer diameter rest upon the drive shaft 14. When the screw 42 is inserted into the threaded hole 40 and tightened, the bottom ledge 48 of the head 50 of the screw 42 presses down on the Belleville disk spring 44 and compresses the Belleville disk spring 44 downward. The downward compression of the Belleville disk spring 44 causes the outer diameter of the spring 44 to expand radially with respect to the axis of rotation A and impinge on the wall of the bore 34. The screw 42 is tightened until a sufficient radial pressure is exerted by the outer diameter of the spring 44 on the wall of the bore 34 so that a line of contact between the wall of the bore 34 and the spring 44 is established that secures the disk hub 32 to the drive shaft 14. Thus, a connection between the drive shaft 14 and the disk hub 32 exists through the Bellville disk spring 44 acting as an intermediary. One advantage of such a connection is that the mounting location of the hub with respect to any shaft feature is highly variable.

For example, the connection requires only that the threaded end of the drive shaft 14 lie within the bore 34 of the disk hub 32 when the gap between the light source 22 and the encoder disk 30 is properly set. In addition, the engagement between the drive shaft 14 and the bore 34 must be enough to approximately align their axes and provide purchase between the spring 44 on the disk hub 32 and drive shaft 14. Since there is a substantial range in the distance from the encoder mounting plane to the end of the drive shaft 14, the connection is possible for a large variation of sizes of drive shafts that can vary from motor to motor. Other advantages of the above-mentioned connection are that: 1) the encoder disk 30 is more easily removed since there is little if any damage to the hub or shaft surfaces during installation which is in contrast to the damage caused by conventional set-screws that damage the shaft, 2) a good mechanical advantage is achieved and a secure fixation between the hub and shaft is achieved since a large screw can be used, 3) the screw is easily accessed from the top of the encoder due to its ideal position and 4) a superior holding force compared with earlier methods of attachment is achieved by the large contact area of the washer on the hub.

Figure 4:
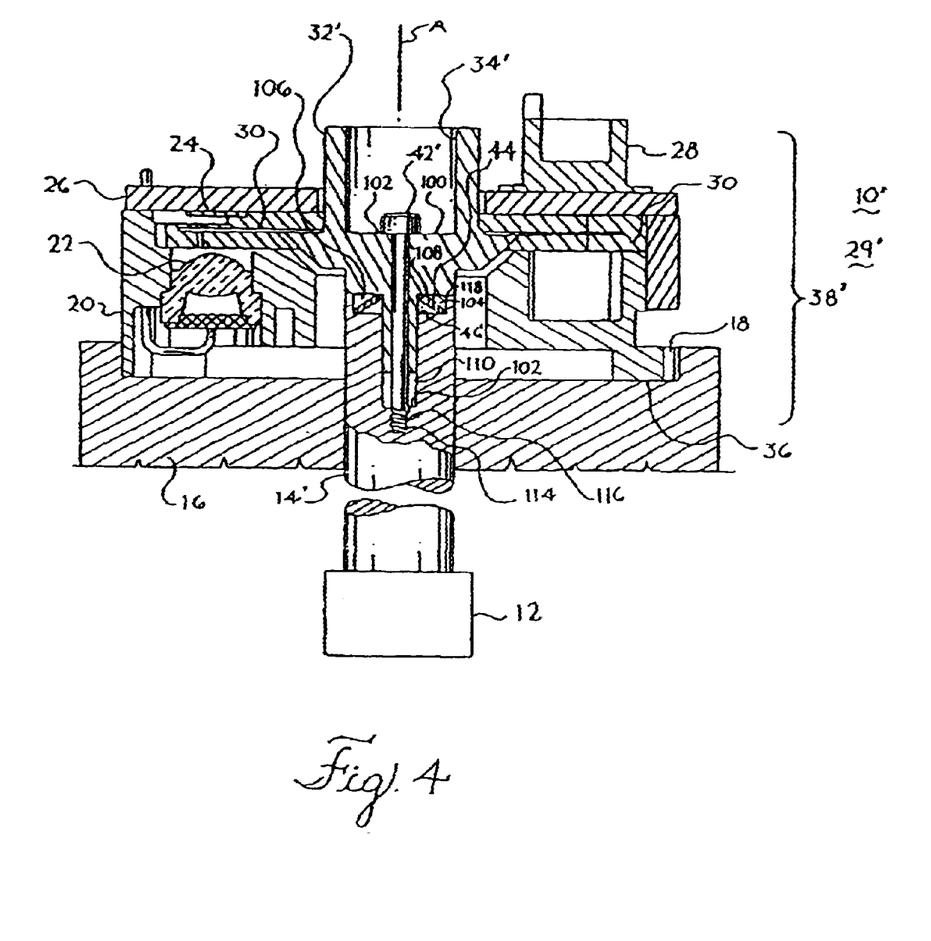
FIG. 4 illustrates a cross-sectional view of a second embodiment of an angle measuring system according to the present invention.

Note that the attachment between the encoder disk and drive shaft of the encoder of FIGS. 1–3 can be altered so that a portion of the encoder disk is inserted into the drive shaft. This attachment is illustrated in FIG. 4, wherein like components have been identified by like numerals. In particular, the encoder 29' includes a motor 12 with a rotating drive shaft 14' that extends through an endplate 16 of the motor 12. The endplate 16 may have a recess 18 that supports an encoder housing 20. Within the encoder housing 20, a light source 22 is positioned. The light source 22 is aligned with a light sensor 24 that is attached to the underside of a PC board 26 that is attached to the top of the encoder housing 20. An electrical connector 28 is attached to the PC board 26 and electrically connected to the light sensor 24.

As shown in FIG. 4, the encoder disk 30 is integrally attached to a disk hub 32' that engages the drive shaft 14'. The disk hub 32' has a central bore 34' that is cylindrical in shape and has a bottom surface 100 that is annular in shape with a central opening 102.

As shown in FIG. 4, the drive shaft 14' has central bore 104 that has a diameter that varies in a step-like manner. The central bore 104 includes: a portion 106 that has a maximum diameter and extends from the end 108 of the drive shaft 14' to an annular ledge 46' and a second portion 110 that has a lesser diameter extends from the annular ledge 46' to a second ledge 112. A third portion 114 of the central bore 104 has a lesser diameter and extends from the ledge 112 to a bottom surface 116. The third portion 114 is threaded.

The disk-hub 32' is secured to the drive shaft 14' by an encoder hub attachment system 38' that includes: 1) the a threaded portion 114 of the central bore 104 that lies along the axis of rotation A of the drive shaft 14, 2) a screw 42' and 3) a spring, such as a Belleville disk spring 44 or a conical washer. As shown in FIG. 4, the Belleville disk spring 44 is placed on and supported on the annular ledge 46'. Once the Belleville disk spring 44 is positioned on the ledge 46', the screw 42' is inserted into the central opening 102 of the disk hub 32' and threadedly engages the threaded portion 114 of the drive shaft 14'.

When the screw 42' is inserted into the threaded portion 114 and tightened, the bottom ledge 118 of the disk hub 32' presses down on the Belleville disk spring 44 and compresses the Belleville disk spring 44 downward. The downward compression of the Belleville disk spring 44 causes the outer diameter of the spring 44 to expand radially with respect to the axis of rotation A and impinge on the wall of the portion 106 of the central bore 104. The screw 42 is tightened until a sufficient radial pressure is exerted by the outer diameter of the spring 44 on the wall of the portion 106 so that a line of contact between the wall of the portion 106 and the spring 44 is established that secures the disk hub 32' to the drive shaft 14'.

Figures 5, 6, 7:
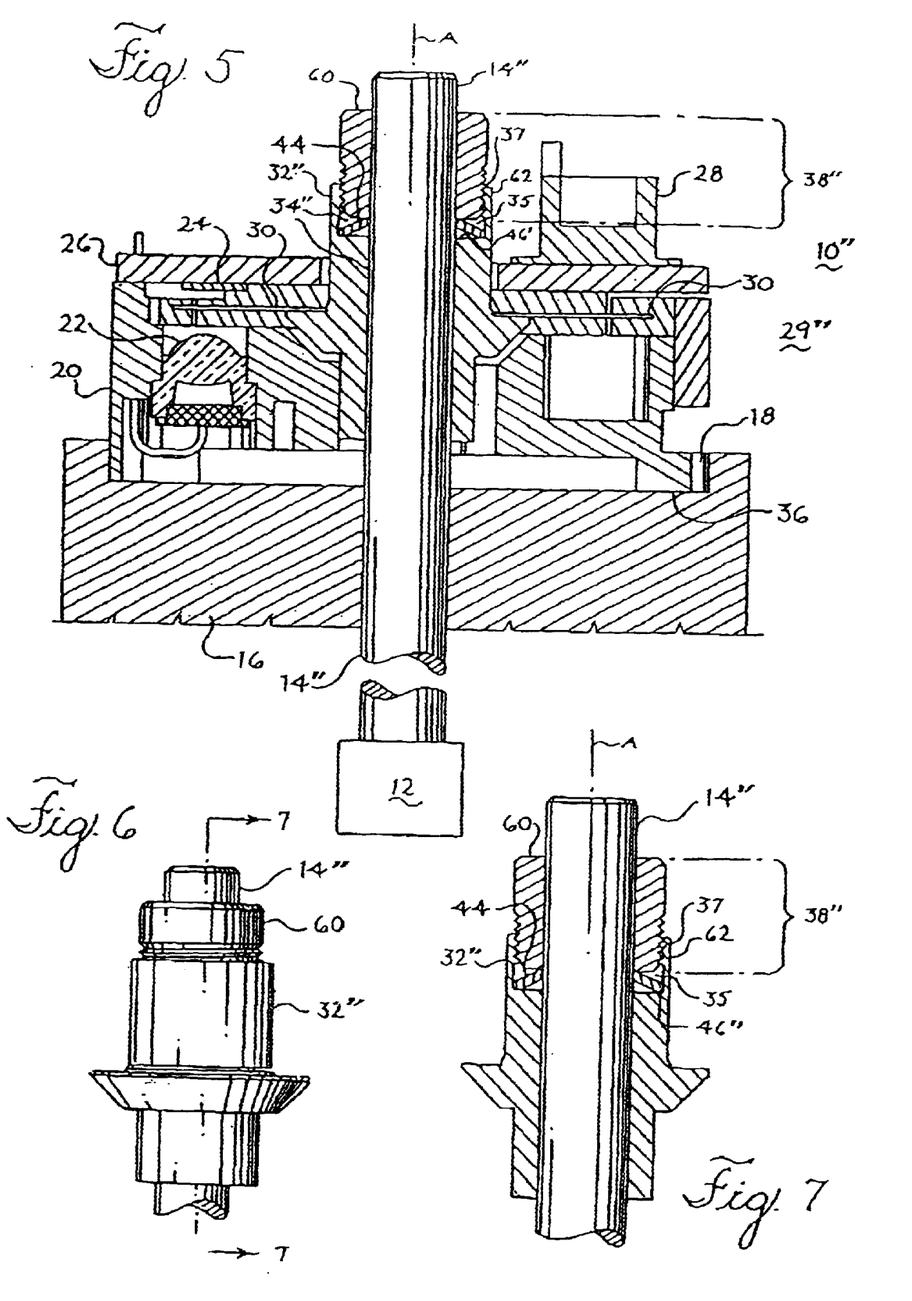
FIG. 5 illustrates a cross-sectional view of a third embodiment of an angle measuring system according to the present invention.
FIG. 6 illustrates a front view of an embodiment of an encoder hub attachment system used with the angle measuring system of FIG. 5.
FIG. 7 is a cross-sectional view of the encoder hub attachment system of FIG. 6 taken along lines 7—7 of FIG. 6.

A third embodiment of an angle measuring system commonly referred to as an encoder is shown in FIGS. 5–7. The encoder 29" of FIGS. 5–7 is similar in structure to a number of the components of the encoder 29 of FIGS. 1–3 and so like numerals have been used in FIGS. 5–7 as in FIGS. 1–3 to identify like components. With that said, the encoder 29" shown in FIG. 5 includes a motor 12 with a rotating drive shaft 14" that extends through an endplate 16 of the motor 12. The endplate 16 may have a recess 18 that supports an encoder housing 20. Again the recess 18 is not necessary for the present invention. Within the encoder housing 20, a light source 22 is positioned. The light source 22 is aligned with a light sensor 24 that is attached to the underside of a PC board 26 that is attached to the top of the encoder housing 20. An electrical connector 28 is attached to the PC board 26 and electrically connected to the light sensor 24.

As shown in FIG. 5, an encoder 29" and its associated encoder disk 30 is positioned between the light source 22 and the light sensor 24. The encoder disk 30 is integrally attached to a disk hub 32" that engages the drive shaft 14". The disk hub 32" has a central bore 34" that has a diameter that varies in a step-like manner. As shown in FIGS. 5 and 7, a substantial lower portion of the bore 34" has a diameter that substantially corresponds to the diameter of the drive shaft 14". An upper portion of the bore 34" has a diameter that is larger than that of the lower portion of the bore 34" so that an annular pocket 35 is formed between the disk hub 32" and the drive shaft 14" once the drive shaft 14" is inserted into the bore 34". The annular pocket 35 is accessible from the top and has threads formed along the interior wall 37.

Once the encoder 29" is placed on the drive shaft 14" and all adjustments have been made to properly position the encoder 29" with respect to the drive shaft 14", the encoder 29" is secured to a mounting surface 36, presumed to be perpendicular to the rotational axis of the drive shaft 14".

The disk hub 32" is secured to the drive shaft 14" by an encoder hub attachment system 38" that includes: 1) an externally threaded cap 60, 2) a spring, such as a Belleville disk spring 44 or a conical washer and 3) the disk hub 32" with its step-like diameters accommodating the drive shaft 14", disk spring 44 and mating thread. Two differences between the attachment system 38" of FIGS. 5–7 and the attachment system 38 of FIGS. 1–3 are that neither hole 40 formed in the drive shaft nor screw 42 are necessary in the attachment system 38". As shown in FIGS. 5 and 7, the Belleville disk spring 44 is placed within the pocket 35 so that the upper portion of the drive shaft 14" extends through the opening of the spring 44. The diameter of the pocket 35 must accommodate the outer diameter of the Belleville disk spring 44 placed within it. The Belleville disk spring 44 the requires an inner diameter slightly larger than the drive shaft 14" that extends through its opening.

Once the Belleville disk spring 44 is placed on and supported on the annular ledge 46" of pocket 35, the externally threaded cap 60 is inserted into the pocket 35 and rotated so that the external threads on the side wall 62 of the cap 60 threadedly engage the threaded portion of the interior wall 37 of the pocket 35.

When the screw cap 60 is inserted into the pocket 35 and tightened, the bottom of the side wall 62 of the screw cap 60 presses down on the Belleville disk spring 44 and compresses the Belleville disk spring 44 downward. The downward compression of the Belleville disk spring 44, after the outer diameter seats itself against the disk hub 32", causes the inner diameter of the spring 44 to contract radially with respect to the axis of rotation A and impinge on the drive shaft 14". The cap 60 is tightened until a sufficient radial pressure is exerted by the inner diameter of the spring 44 on the drive shaft 14" so that a line of contact between the drive shaft 14" and the spring 44 is established that secures the disk hub 32" to the drive shaft 14". Thus, a connection between the drive shaft 14" and the disk hub 32" exists through the Bellville disk spring 44 acting as an intermediary.

Figure 8:
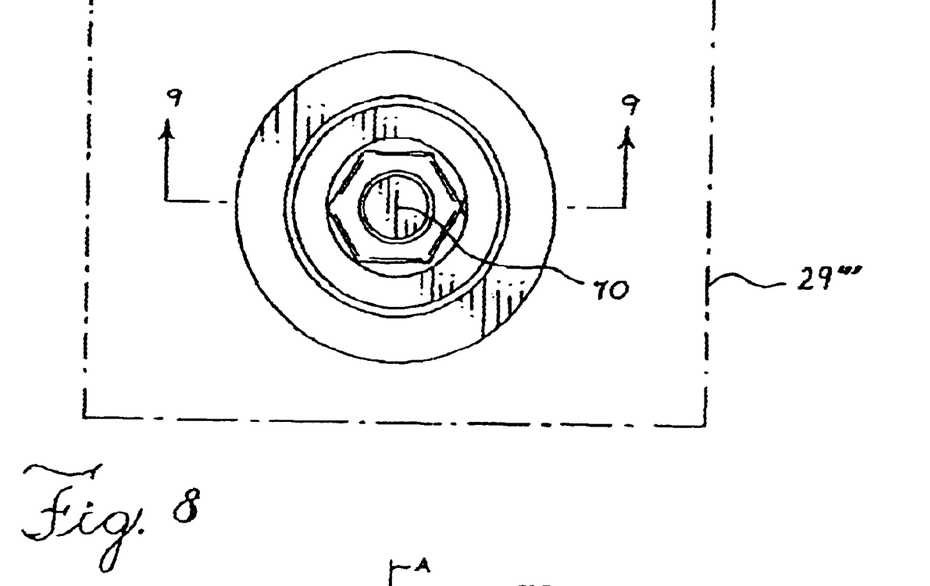
FIG. 8 illustrates a top view of a second embodiment of an encoder hub attachment system that can be used with the angle measuring system of FIG. 5.
Figure 9:
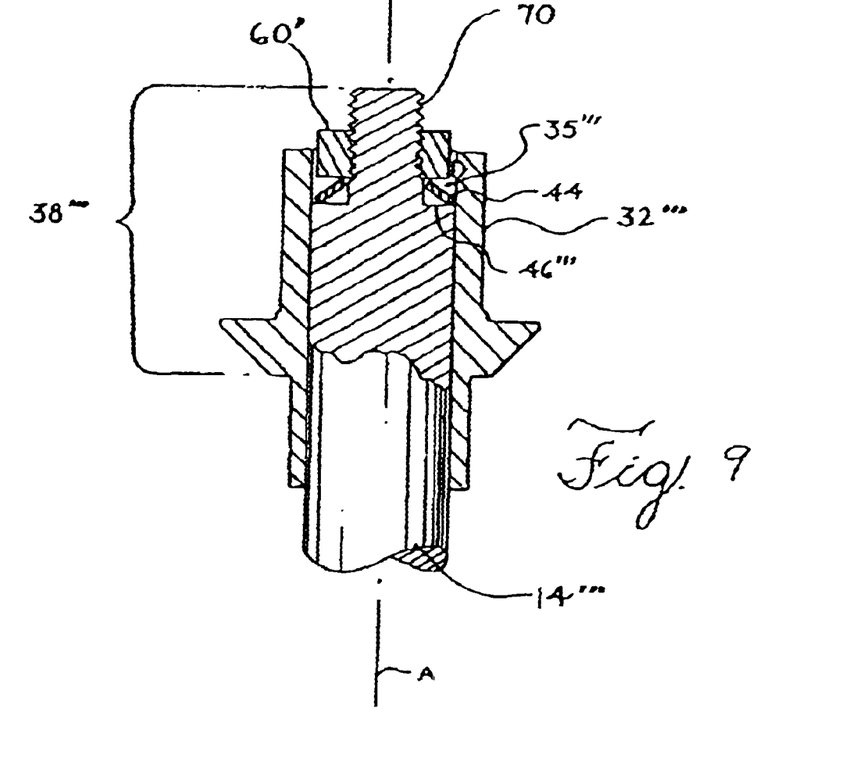
FIG. 9 illustrates a cross-sectional view of the encoder hub attachment system of FIG. 9 taken along line 9—9 of FIG. 8.

A fourth embodiment of an angle measuring system commonly referred to as an encoder is shown in FIGS. 8–9. The encoder 29''' of FIGS. 8–9 is similar in structure to a number of the components of the encoder 29" of FIGS. 5–7 and so like numerals have been used in FIGS. 8–9 to identify like components. In particular, the shapes of the disk hub, the threaded cap, the drive shaft and the spring are varied in the embodiment of FIGS. 8–9 when compared with the embodiment of FIGS. 5–7. For example, the upper wall of the disk hub 32''' shown in FIG. 9 has been thickened when compared with the upper wall of disk hub 32" of FIGS. 5 and 7. In addition, the rotating drive shaft 14''' has an upper portion 70 that is externally threaded and has a smaller diameter than the rest of the drive shaft 14''' attached below. Thus, an annular-like pocket 35''' is formed between the upper wall of the disk hub 32''' and the upper portion 70. The disk hub 32''' is secured to the drive shaft 14''' by an encoder hub attachment system 38''' that includes: 1) an internally threaded nut 60' that threadedly engages the upper portion 70, 2) a spring, such as a Belleville disk spring 44 or a conical washer and 3) the disk hub 32''' accommodating the drive shaft 14" and disk spring 44.

As shown in FIG. 9, the Belleville disk spring 44 is placed within the pocket 35''' so that the upper portion 70 of the drive shaft 14''' extends through the opening of the spring 44. Once the Belleville disk spring 44 is placed on and supported on the annular ledge 46''' of pocket 35", the nut 60' is inserted over the upper portion of the drive shaft 14''' and rotated so that the internal threads of the nut 60' threadedly engage the threaded exterior portion of the upper portion 70 of the drive shaft 14'''.

When the nut 60' is inserted into the pocket 35''' and tightened, the bottom of the nut 60' presses down on the Belleville disk spring 44 and compresses the Belleville disk spring 44 downward. The downward compression of the Belleville disk spring 44, after the outer diameter seats itself against the disk hub 32''', causes the inner diameter of the spring 44 to contract radially with respect to the axis of rotation A and impinge on the drive shaft 14'''. The cap 60' is tightened until a sufficient radial pressure is exerted by the inner diameter of the spring 44 on the drive shaft 14" so that a line of contact between the drive shaft 14''' and the spring 44 is established that secures the disk hub 32''' to the drive shaft 14'''. Thus, a connection between the drive shaft 14''' and the disk hub 32''' exists through the Bellville disk spring 44 acting as an intermediary.

Note that the above-described rotating drive shaft 14''', disk hub 32''' and nut 60' can replace the corresponding drive shaft 14", disk hub 32" and the screw cap 60 of the encoder 29" shown in FIG. 5.

Figure 10:
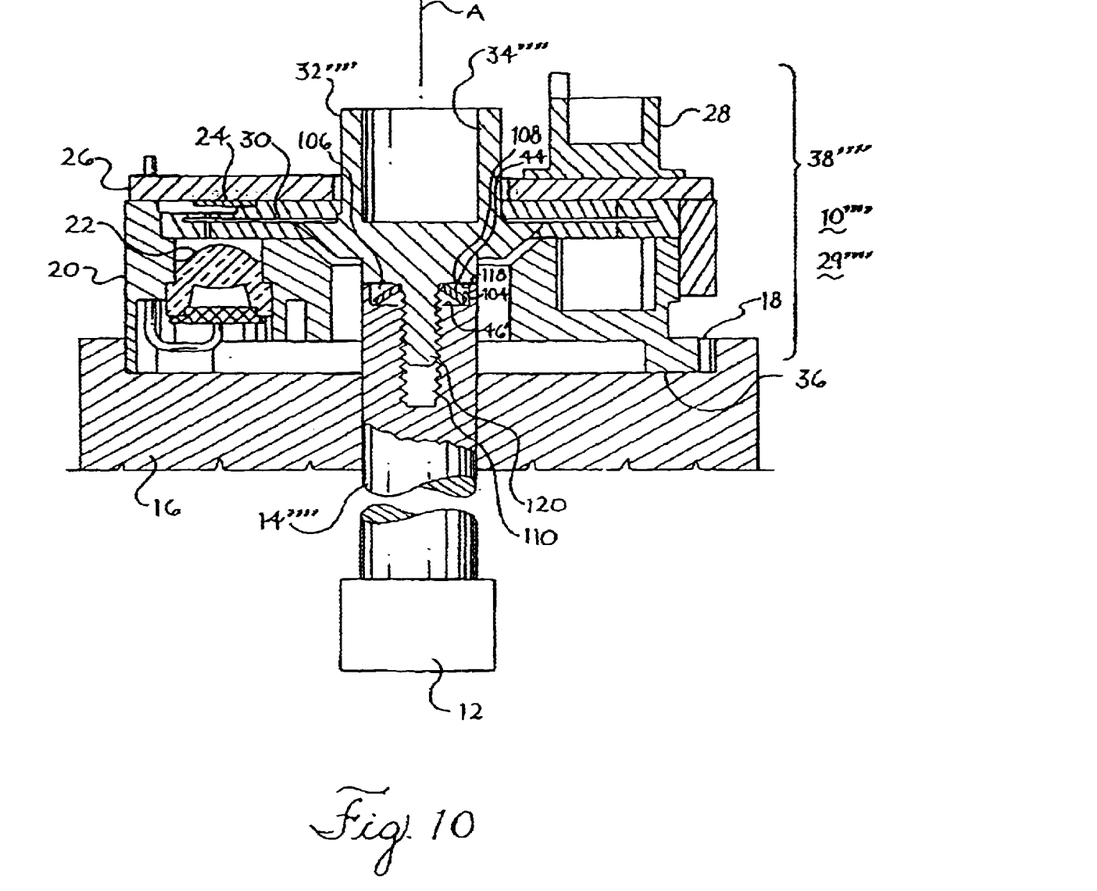
FIG. 10 illustrates a cross-sectional view of a fourth embodiment of an angle measuring system according to the present invention.

The attachment between the encoder disk and drive shaft of the encoder of FIG. 4 can be altered so that a portion of the encoder disk is inserted into the drive shaft. This attachment is illustrated in FIG. 10, wherein like components have been identified by like numerals. In particular, the encoder 29'''' is very similar to the encoder 29' where the screw 42', central opening 102 and the third portion 114 of the central bore 104 have been eliminated. In their place, the exterior wall of the lower portion 120 of the disk hub 32'''' is threaded and threadedly engages a threaded interior wall of the portion 110. In this embodiment, the disk-hub 32'''' is secured to the drive shaft 14'''' by an encoder hub attachment system 38'''' that includes: 1) the threaded lower portion 120, 2) the threaded portion 110 and 3) a spring, such as a Belleville disk spring 44 or a conical washer. As shown in FIG. 10, the Belleville disk spring 44 is placed on and supported on the annular ledge 46'. Once the Belleville disk spring 44 is positioned on the ledge 46', the lower portion 120 is inserted into and threadedly engages the threaded portion 110.

When the lower portion 120 is inserted into the threaded portion 110 and tightened, the bottom ledge 118 of the disk hub 32'''' presses down on the Belleville disk spring 44 and compresses the Belleville disk spring 44 downward. The downward compression of the Belleville disk spring 44 causes the outer diameter of the spring 44 to expand radially with respect to the axis of rotation A and impinge on the wall of the portion 106 of the central bore 104. The screw 42 is tightened until a sufficient radial pressure is exerted by the outer diameter of the spring 44 on the wall of the portion 106 so that a line of contact between the wall of the portion 106 and the spring 44 is established that secures the disk hub 32'''' to the drive shaft 14''''.

Note that in each of the above embodiments of FIGS. 1–10, the use of a disk spring results in an easier manner to secure an encoder to a rotating drive shaft.

Note that the above described attachment schemes of FIGS. 1–10 are suitable for both modular as well as bearing encoders with the only requirement for the attachment scheme of FIGS. 1–3 that the end of the drive shaft 14 lies within the disk hub 32 after the encoder is attached to the mounting surface and after the disk is properly positioned/gapped.

It is to be understood that the forms of the invention described herewith are to be taken as preferred embodiments and that various charges in the shape, size and arrangement of parts may be resorted to, without departing from the spirit of the invention or the scope of the claims. For example, externally threaded components that engage internally threaded components can be altered so that the external and internal thread designations are reversed.

What is claimed is:

1. An angle measuring system comprising:
   a drive shaft that rotates about an axis of rotation;
   an encoder; and
   an encoder attachment system comprising a Belleville disk spring that lies upon said drive shaft and generates a radial pressure with respect to said axis of rotation so as to attach said encoder to said drive shaft.

2. The angle measuring system of claim 1, wherein said radial pressure is radially directed away from said axis of rotation.

3. The angle measuring system of claim 1, further comprising:
   a light source that emits light; and
   a light sensor that receives said light, wherein a portion of said encoder is positioned between said light source and said light sensor.

4. The angle measuring system of claim 1, wherein said encoder comprises:
- an encoder disk; and
- a disk hub that is integrally attached to said encoder disk, said disk hub has a bore into which a portion of said drive shaft is inserted.

5. The angle measuring system of claim 1, wherein said encoder attachment system comprises:
- a screw that is inserted into a hole formed in said drive shaft; and
- wherein said screw compresses said Belleville disk spring so as to generate said radial pressure.

6. The angle measuring system of claim 2, wherein said encoder attachment system comprises:
- a screw that is inserted into a hole formed in said drive shaft; and
- wherein said screw compresses said Belleville disk spring so as to generate said radial pressure.

7. The angle measuring system of claim 4, wherein said encoder attachment system comprises:
- a screw that is inserted into a hole formed in said drive shaft; and
- said Belleville disk spring is positioned within said bore, wherein said screw compresses said Belleville disk spring so as to engage a wall of said bore and generate said radial pressure.

8. The angle measuring system of claim 1, wherein said encoder attachment system comprises:
- a cap that is inserted into a hole formed in said encoder; and
- wherein said cap compresses said encoder and said Belleville disk spring so as to generate said radial pressure.

9. The angle measuring system of claim 2, wherein said encoder attachment system comprises:
- a cap that is inserted into a hole formed in said encoder; and
- wherein said cap compresses said encoder and said Belleville disk spring so as to generate said radial pressure.

10. The angle measuring system of claim 4, wherein said encoder attachment system comprises:
- a cap that is inserted into a hole formed in said encoder; and
- said Belleville disk spring is positioned within said bore, wherein said cap compresses said encoder and said Belleville disk spring so as to engage a wall of said bore and generate said radial pressure.

11. The angle measuring system of claim 1, wherein said radial pressure is radially directed toward said axis of rotation.

12. The angle measuring system of claim 1, wherein said encoder comprises:
- an encoder disk;
- a disk hub that is integrally attached to said encoder disk, said disk hub has a bore into which a portion of said drive shaft is inserted; and
- wherein said encoder attachment system further comprises:
  - a cap that is inserted into said bore; and
  - wherein said cap compresses said Bellville disk spring so as to generate said radial pressure.

13. The angle measuring system of claim 11, wherein said encoder comprises:
- an encoder disk;
- a disk hub that is integrally attached to said encoder disk, said disk hub has a bore into which a portion of said drive shaft is inserted; and
- wherein said encoder attachment system further comprises:
  - a cap that is inserted into said bore; and
  - wherein said cap compresses said Belleville disk spring so as to generate said radial pressure.

14. A method of attaching an encoder to a drive shaft that rotates about an axis of rotation, the method comprising:
- positioning said encoder adjacent to said drive shaft that rotates about said axis of rotation; and
- rotating a screw so as to compress a spring that generates a radial pressure with respect to said axis of rotation so as to attach said encoder to said drive shaft.

15. The method of claim 14, wherein said positioning comprises inserting a portion of said drive shaft into a bore formed in said encoder.

16. The method of claim 14, wherein said radial pressure is radially directed away from said axis of rotation.

17. A method of attaching an encoder to a drive shaft that rotates about an axis of rotation, the method comprising:
- positioning an encoder adjacent to a drive shaft that rotates about an axis of rotation; and
- rotating a cap so as to compress a spring that generates a radial pressure with respect to said axis of rotation so as to attach said encoder to said drive shaft.

18. The method of claim 17, wherein said positioning comprises inserting a portion of said drive shaft into a bore formed in said encoder.

19. The method of claim 17, wherein said radial pressure is radially directed toward said axis of rotation.

* * * * *

UNITED STATES PATENT AND TRADEMARK OFFICE
CERTIFICATE OF CORRECTION

PATENT NO. : 6,642,508 B2
DATED : November 4, 2003
INVENTOR(S) : Robert Setbacken et al.

It is certified that error appears in the above-identified patent and that said Letters Patent is hereby corrected as shown below:

Column 8,
Line 27, after "positioning" delete "said" and substitute -- an -- in its place.
Line 27, after "adjacent to" delete "said" and substitute -- a -- in its place.
Line 28, after "rotates about" delete "said" and substitute -- an -- in its place.

Signed and Sealed this

Thirtieth Day of November, 2004

JON W. DUDAS
*Director of the United States Patent and Trademark Office*